US012008220B2

(12) United States Patent
Yu et al.

(10) Patent No.: US 12,008,220 B2
(45) Date of Patent: Jun. 11, 2024

(54) LABEL DISPLAY METHOD AND APPARATUS, ELECTRONIC DEVICE, AND COMPUTER-READABLE MEDIUM

(71) Applicant: Beijing Bytedance Network Technology Co., Ltd., Beijing (CN)

(72) Inventors: Beichuan Yu, Beijing (CN); Zhaoyu Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/808,230

(22) Filed: Jun. 22, 2022

(65) Prior Publication Data

US 2022/0317838 A1    Oct. 6, 2022

Related U.S. Application Data

(63) Continuation of application No. PCT/CN2020/127280, filed on Nov. 6, 2020.

(30) Foreign Application Priority Data

Jan. 20, 2020   (CN) .................... 202010066372.X

(51) Int. Cl.
*G06F 3/048* (2013.01)
*G06F 3/0482* (2013.01)
*G06F 3/0484* (2022.01)

(52) U.S. Cl.
CPC .......... *G06F 3/0484* (2013.01); *G06F 3/0482* (2013.01)

(58) Field of Classification Search
CPC .............. G06F 3/0482; G06F 3/04842; G06F 16/9535; G06F 16/54; G06F 16/5866; G06F 3/04817; G06F 40/295
See application file for complete search history.

(56) References Cited

U.S. PATENT DOCUMENTS 6,147,714 A * 11/2000 Terasawa ........... H04N 21/8153
725/139
6,522,342 B1 * 2/2003 Gagnon ............. H04N 21/4143
715/833

(Continued)

FOREIGN PATENT DOCUMENTS

CN    104537115 A    4/2015
CN    107087235 A    8/2017

(Continued)

OTHER PUBLICATIONS

Notification to Grant Patent Right for Invention for Chinese Patent Application No. 202010066372.X (16 pages).

(Continued)

*Primary Examiner* — Steven B Theriault
(74) *Attorney, Agent, or Firm* — Astute IP Law Group

(57) ABSTRACT

A label display method and apparatus, an electronic device, and a computer-readable medium. The method includes: displaying a label selection control on a feed display interface in a process of displaying a feed stream, where the label selection control corresponds to at least one label; receiving selection information inputted by a user through performing a selection operation on the at least one label; acquiring a recommended information corresponding to the selection information; and displaying the recommended information on the feed display interface. This method realizes flexible control of the timing of label display.

14 Claims, 11 Drawing Sheets

(56) References Cited

U.S. PATENT DOCUMENTS

| | | | | |
|---|---|---|---|---|
| 6,633,293 B1* | 10/2003 | Kojima | G06F 16/58 | 345/473 |
| 7,882,436 B2* | 2/2011 | Burke | H04N 21/4312 | 715/825 |
| 7,966,638 B2* | 6/2011 | Gossweiler, III | H04N 21/262 | 725/44 |
| 7,984,056 B1* | 7/2011 | Kane | G06Q 30/02 | 707/767 |
| 8,122,031 B1* | 2/2012 | Mauro | G06Q 30/02 | 707/769 |
| 8,229,873 B1* | 7/2012 | Dolan | G06N 5/048 | 706/45 |
| 8,255,812 B1* | 8/2012 | Parparita | G06F 16/958 | 715/826 |
| 8,275,666 B2 | 9/2012 | Chang et al. | | |
| 8,397,258 B2* | 3/2013 | Kim | H04N 21/47 | 725/39 |
| 8,606,807 B2* | 12/2013 | Drieschner | G06F 16/957 | 707/765 |
| 8,717,339 B2* | 5/2014 | Satake | H04N 5/45 | 715/810 |
| 8,752,089 B2* | 6/2014 | Feldstein | H04N 5/45 | 725/38 |
| 9,066,122 B1* | 6/2015 | Rattazzi | H04N 21/44204 | |
| 9,069,439 B2* | 6/2015 | Bawel | G06F 3/04815 | |
| 9,179,086 B2* | 11/2015 | Abello | H04N 21/4438 | |
| 9,251,124 B2* | 2/2016 | Steinfl | G06F 3/04842 | |
| 9,535,559 B2* | 1/2017 | Poornachandran | H04N 21/4532 | |
| 9,612,733 B2* | 4/2017 | Kim | H04N 21/42204 | |
| 9,720,560 B2* | 8/2017 | Prakash | G06F 3/04812 | |
| 9,927,952 B2* | 3/2018 | Estrada | G06F 3/0482 | |
| 10,203,927 B2* | 2/2019 | Lee | G06F 3/1431 | |
| 10,209,866 B2* | 2/2019 | Johnston | H04N 21/4312 | |
| 10,219,025 B2* | 2/2019 | Kawakami | H04N 21/472 | |
| 11,102,552 B2* | 8/2021 | Jayaram | H04N 21/44226 | |
| 11,290,762 B2* | 3/2022 | Christie | H04N 21/4668 | |
| 11,297,392 B2* | 4/2022 | Christie | G06F 3/03547 | |
| 2001/0023401 A1* | 9/2001 | Weishut | H04N 21/84 | 705/306 |
| 2002/0010929 A1* | 1/2002 | Collier | H04N 21/4755 | 725/40 |
| 2002/0112237 A1* | 8/2002 | Kelts | G06F 16/954 | 725/135 |
| 2003/0020671 A1* | 1/2003 | Santoro | G09G 5/14 | 345/1.3 |
| 2003/0106061 A1* | 6/2003 | Gusler | H04N 21/44222 | 725/38 |
| 2003/0174154 A1* | 9/2003 | Yukie | H04N 21/6131 | 348/E7.071 |
| 2004/0060061 A1* | 3/2004 | Parker | H04N 21/47 | 725/38 |
| 2004/0268413 A1* | 12/2004 | Reid | H04N 21/47 | 348/E7.071 |
| 2005/0071782 A1* | 3/2005 | Barrett | H04N 5/45 | 348/E7.071 |
| 2006/0230427 A1* | 10/2006 | Kunkel | H04N 21/235 | 725/100 |
| 2006/0238625 A1* | 10/2006 | Sasaki | H04N 1/00416 | 348/231.3 |
| 2007/0011702 A1* | 1/2007 | Vaysman | H04N 21/4828 | 348/E7.071 |
| 2007/0083536 A1* | 4/2007 | Darnell | G06F 16/9535 | |
| 2007/0083894 A1* | 4/2007 | Gonsalves | G06F 16/958 | 725/35 |
| 2007/0245236 A1* | 10/2007 | Lee | G06F 40/103 | 715/234 |
| 2008/0046931 A1* | 2/2008 | Corbett | H04N 21/42204 | 725/52 |
| 2008/0060006 A1* | 3/2008 | Shanks | H04N 21/4316 | 348/E7.071 |
| 2008/0082941 A1* | 4/2008 | Goldberg | G06F 3/0482 | 715/810 |
| 2008/0111822 A1* | 5/2008 | Horowitz | H04N 21/4622 | 345/530 |
| 2008/0155605 A1* | 6/2008 | Jeon | H04N 21/482 | 725/47 |
| 2009/0031246 A1 | 1/2009 | Cowtan et al. | | |
| 2009/0256835 A1* | 10/2009 | Moote | H04N 21/440263 | 345/418 |
| 2009/0293014 A1* | 11/2009 | Meuninck | H04N 21/4312 | 715/810 |
| 2010/0100841 A1* | 4/2010 | Shin | H04M 1/72469 | 715/764 |
| 2011/0167061 A1* | 7/2011 | Li | G06F 16/50 | 707/E17.064 |
| 2012/0216146 A1* | 8/2012 | Korkonen | G06F 3/04817 | 715/835 |
| 2012/0278428 A1* | 11/2012 | Harrison | H04N 21/2665 | 709/217 |
| 2013/0047123 A1* | 2/2013 | May | G06F 3/04817 | 715/834 |
| 2013/0222263 A1* | 8/2013 | Shah | G06F 3/0488 | 345/173 |
| 2013/0314441 A1* | 11/2013 | Grasset | G06T 11/60 | 345/633 |
| 2014/0089802 A1* | 3/2014 | Wang | H04N 21/482 | 715/719 |
| 2014/0253301 A1 | 9/2014 | Hirayama et al. | | |
| 2015/0011185 A1* | 1/2015 | Foy | H04W 4/029 | 455/410 |
| 2015/0012833 A1* | 1/2015 | Foy | G06Q 30/01 | 715/738 |
| 2015/0220525 A1* | 8/2015 | Ross | G06F 16/435 | 707/737 |
| 2015/0312613 A1* | 10/2015 | Hunt | H04N 21/23439 | 725/37 |
| 2016/0149956 A1* | 5/2016 | Birnbaum | H04L 63/20 | 726/1 |
| 2016/0227149 A1* | 8/2016 | Dickens | H04N 7/104 | |
| 2017/0195733 A1* | 7/2017 | de Mello Maia | H04N 21/4826 | |
| 2017/0331964 A1* | 11/2017 | O | H04N 1/00474 | |
| 2017/0332150 A1* | 11/2017 | Kehler | H04N 21/251 | |
| 2018/0091832 A1* | 3/2018 | Zeiler | G06V 10/82 | |
| 2018/0091858 A1* | 3/2018 | Khazanov | H04N 21/4223 | |
| 2018/0113579 A1* | 4/2018 | Johnston | H04N 21/482 | |
| 2019/0215452 A1* | 7/2019 | Chen | H04N 5/772 | |
| 2020/0110513 A1* | 4/2020 | Mesguich Havilio | G06F 3/017 | |
| 2020/0226896 A1* | 7/2020 | Robertson | G06Q 10/1091 | |
| 2020/0257742 A1* | 8/2020 | Chan | G06F 16/958 | |
| 2020/0257825 A1* | 8/2020 | Chan | G06F 16/9535 | |
| 2020/0374596 A1* | 11/2020 | Zeiler | H04N 21/47205 | |
| 2022/0019730 A1* | 1/2022 | Sharma | G06N 20/00 | |
| 2022/0404956 A1* | 12/2022 | Choi | G06F 3/04842 | |

FOREIGN PATENT DOCUMENTS

| | | |
|---|---|---|
| CN | 107273489 A | 10/2017 |
| CN | 108133039 A | 6/2018 |
| CN | 108255900 A | 7/2018 |
| CN | 108600818 A | 9/2018 |
| CN | 109189954 A | 1/2019 |
| CN | 109819284 A | 5/2019 |
| CN | 111179007 A | 5/2020 |
| CN | 111273830 A | 6/2020 |
| CN | 111291220 A | 6/2020 |
| JP | 2009069875 A | 4/2009 |
| WO | 2014136268 A1 | 9/2014 |

OTHER PUBLICATIONS

First Office Action for Chinese Patent Application No. 202010066372.X, dated Sep. 16, 2020 (16 pages).

Second Office Action for Chinese Patent Application No. 202010066372.X, dated Dec. 8, 2020 (6 pages).

Third Office Action for Chinese Patent Application No. 202010066372.X (12 pages).

(56) References Cited

OTHER PUBLICATIONS

Supplementary Search for Chinese Patent Application No. 202010066372.X (1 page).
International Search Report for International Patent Application No. PCT/CN2020/127280, dated Jan. 27, 2021 (10 pages).
Office Action in JP2022543046, dated Aug. 29, 2023, 6 pages.

\* cited by examiner

LABEL DISPLAY METHOD AND APPARATUS, ELECTRONIC DEVICE, AND COMPUTER-READABLE MEDIUM

CROSS-REFERENCE TO RELATED APPLICATIONS

This application is a continuation of International Application No. PCT/CN2020/127280, filed on Nov. 6, 2020, which claims priority to Chinese Patent Application No. 202010066372.X, which was filed with the China National Intellectual Property Administration on Jan. 20, 2020, and titled "LABEL DISPLAY METHOD AND APPARATUS, ELECTRONIC DEVICE, AND COMPUTER-READABLE MEDIUM". The disclosures of the above patent applications are incorporated herein by reference in their entireties.

TECHNICAL FIELD

Embodiments of the present disclosure relate to the field of computer technology, and specifically, to a label display method and apparatus, an electronic device, and a computer-readable medium.

BACKGROUND

With the popularity of mobile terminals represented by smartphones, various types of applications are emerging in endlessly. In order to meet the personalized needs of users, some applications display a plurality of interest labels for users to select in a process of opening the applications for the first time, so as to display personalized contents according to the labels selected by the users.

SUMMARY

The summary section of the present disclosure is used to present ideas in a brief form, and these ideas will be described in detail in the description of embodiments section in the following. The summary section of the present disclosure is not intended to identify key features or essential features of the technical solutions claimed to be protected, nor is it intended to be used to limit the scope of the technical solutions claimed to be protected.

Some embodiments of the present disclosure propose a label display method and apparatus, an electronic device, and a computer-readable medium to solve the technical problems mentioned in the background section above.

In a first aspect, some embodiments of the present disclosure provide a label display method applied to a feed display interface, including: displaying a label selection control on the feed display interface in a process of displaying a feed stream, where the label selection control corresponds to at least one label; receiving selection information inputted by a user through performing a selection operation on the at least one label; acquiring recommended information corresponding to the selection information; and displaying the recommended information on the feed display interface.

In a second aspect, some embodiments of the present disclosure provide a label display apparatus, including: a label display unit, configured to display a label selection control on a feed display interface during displaying a feed stream, where the label selection control corresponds to at least one label; a receiving unit, configured to receive selection information inputted by a user through performing a selection operation on the at least one label; an acquiring unit, configured to acquire recommended information corresponding to the selection information; and a video display unit, configured to display the recommended information on the feed display interface.

In a third aspect, some embodiments of the present disclosure provide an electronic device, including: one or more processors; and a storage apparatus, having one or more programs stored thereon, and when one or more programs are executed by the one or more processors, the one or more processors are caused to implement any of the above method.

In a fourth aspect, some embodiments of the present disclosure provide a computer-readable medium having a computer program stored thereon, where the program, when executed by a processor, implements any of the above method.

In a fifth aspect, some embodiments of the present disclosure provide a computer program, including program code, and when a computer runs the computer program, the program code implements the label display method provided by some embodiments of the present disclosure in the first aspect.

An embodiment of the above embodiments of the present disclosure has the following beneficial effects: for a scenario of playing a feed stream, a new label display method is provided. Unlike displaying labels when a user opens an application for the first time, a label selection control is displayed in a process of playing a feed stream, and thus, the timing of displaying the labels can be flexibly controlled.

BRIEF DESCRIPTION OF DRAWINGS

The above and other features, advantages, and aspects of the embodiments of the present disclosure will become more apparent in conjunction with the drawings and with reference to the following description of embodiments. Throughout the drawings, same or similar reference signs indicate same or similar elements. It should be understood that the drawings are illustrative, and the components and elements are not necessarily drawn to scale.

DESCRIPTION OF EMBODIMENTS

Figure 1A:
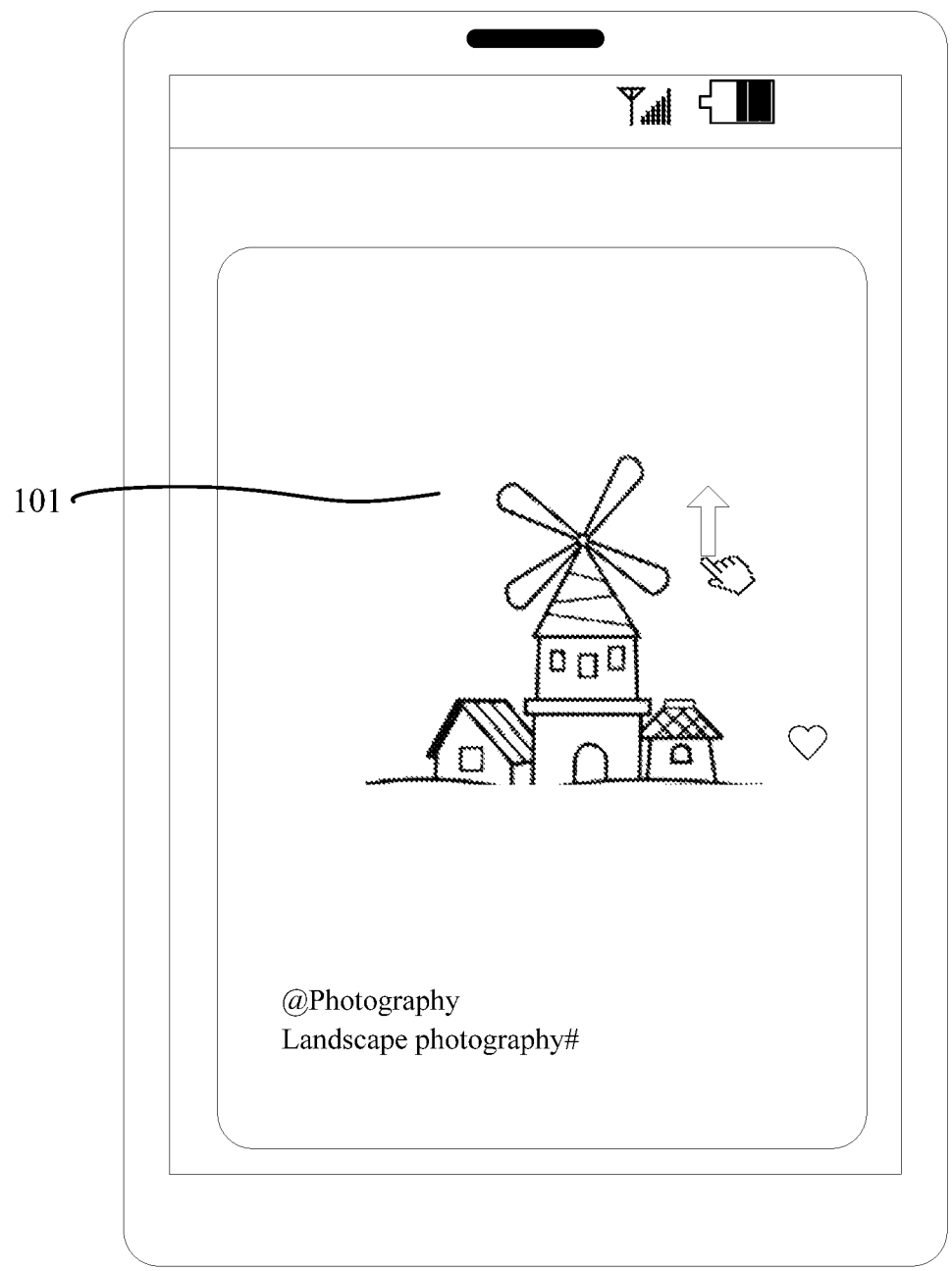
FIG. 1A, FIG. 1B, FIG. 1C, and FIG. 1D are schematic diagrams of an application scenario of a label display method according to some embodiments of the present disclosure.

Embodiments of the present disclosure will be described in greater detail below with reference to the drawings. Although some embodiments of the present disclosure are shown in the drawings, it should be understood, however, that the present disclosure may be implemented in various forms and should not be construed as limited to the embodiments set forth herein. Rather, these embodiments are provided for a more thorough and complete understanding of the present disclosure. It should be understood that the drawings and embodiments of the present disclosure are for illustrative purposes only and are not intended to limit the scope of protection of the present disclosure.

It is also to be noted that, for ease of description, only those portions that relate to the relevant invention are shown in the drawings. The embodiments of the present disclosure and the features of the embodiments may be combined with each other in the absence of conflict.

Note that the concepts "first", "second", etc., mentioned in this disclosure are used only to distinguish between different devices, modules or units, and are not intended to limit the order or interdependence of the functions performed by these devices, modules or units.

It should be noted that the modifications of "one" and "more than one" mentioned in this disclosure are illustrative but not restrictive, and it should be understood by those skilled in the art that, they should be understood as "one or more" unless otherwise clearly indicated in the context.

The names of messages or information interchanged between a plurality of devices in the embodiments of the present disclosure are for illustrative purposes only and are not intended to limit the scope of those messages or information.

The present disclosure will be described in detail below with reference to the drawings and in conjunction with embodiments.

FIG. 1A-FIG. 1D are schematic diagrams of an application scenario of a label display method according to some embodiments of the present disclosure.

The label display method provided by some embodiments of the present disclosure is generally executed by a terminal device. It should be noted that the terminal device may be hardware or software. When the terminal device is hardware, it may be various electronic devices that support video playback, including but not limited to a smartphone, a tablet computer, an e-book reader, a vehicle-mounted terminal, and so on. When the terminal device is software, it may be installed in the electronic devices listed above. It may be implemented as multiple pieces of software or multiple software modules for providing a distributed service, or as a single piece of software or a single software module. There is no specific limitation here.

Figure 1B:
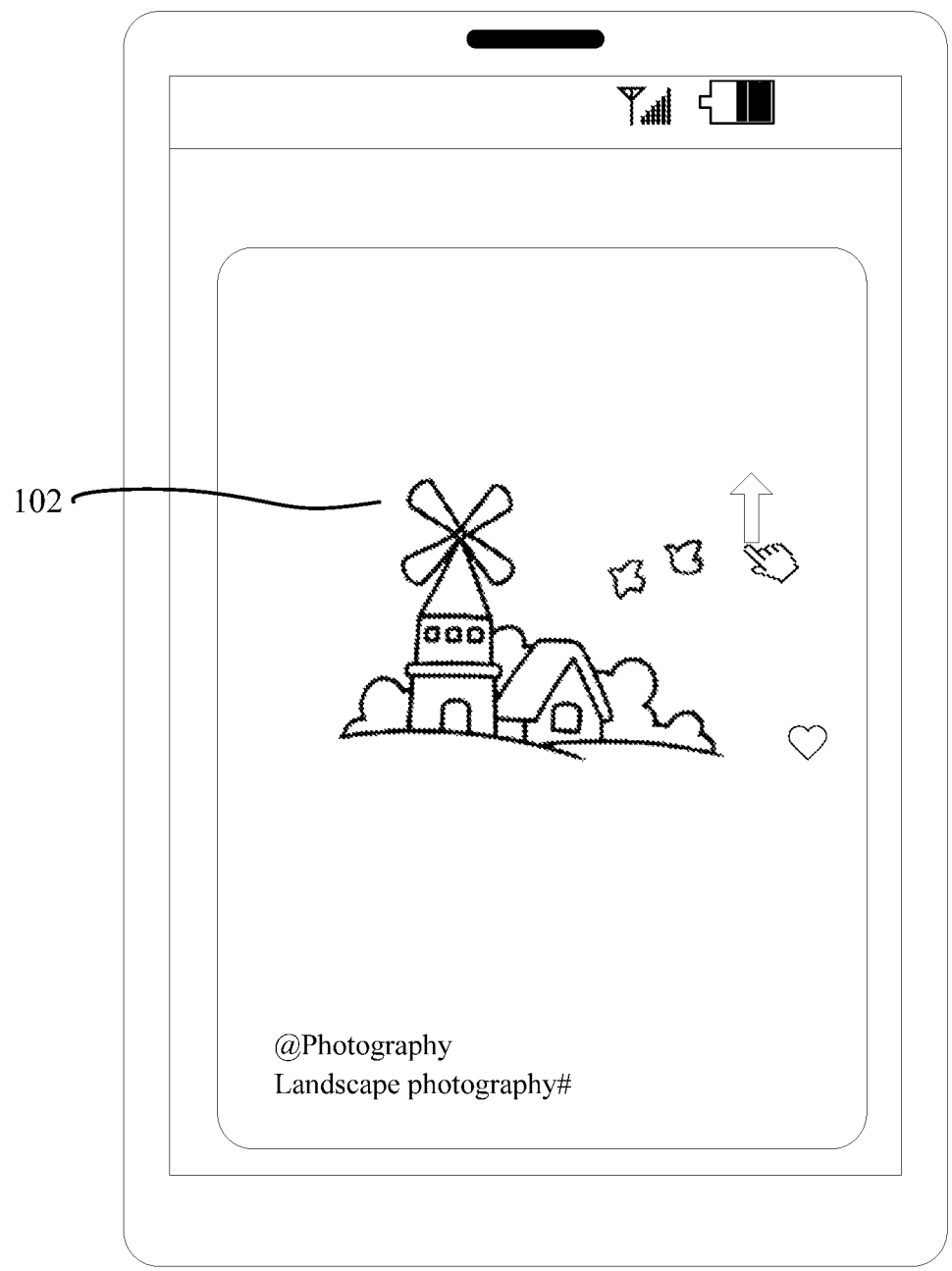
Figure 1C:
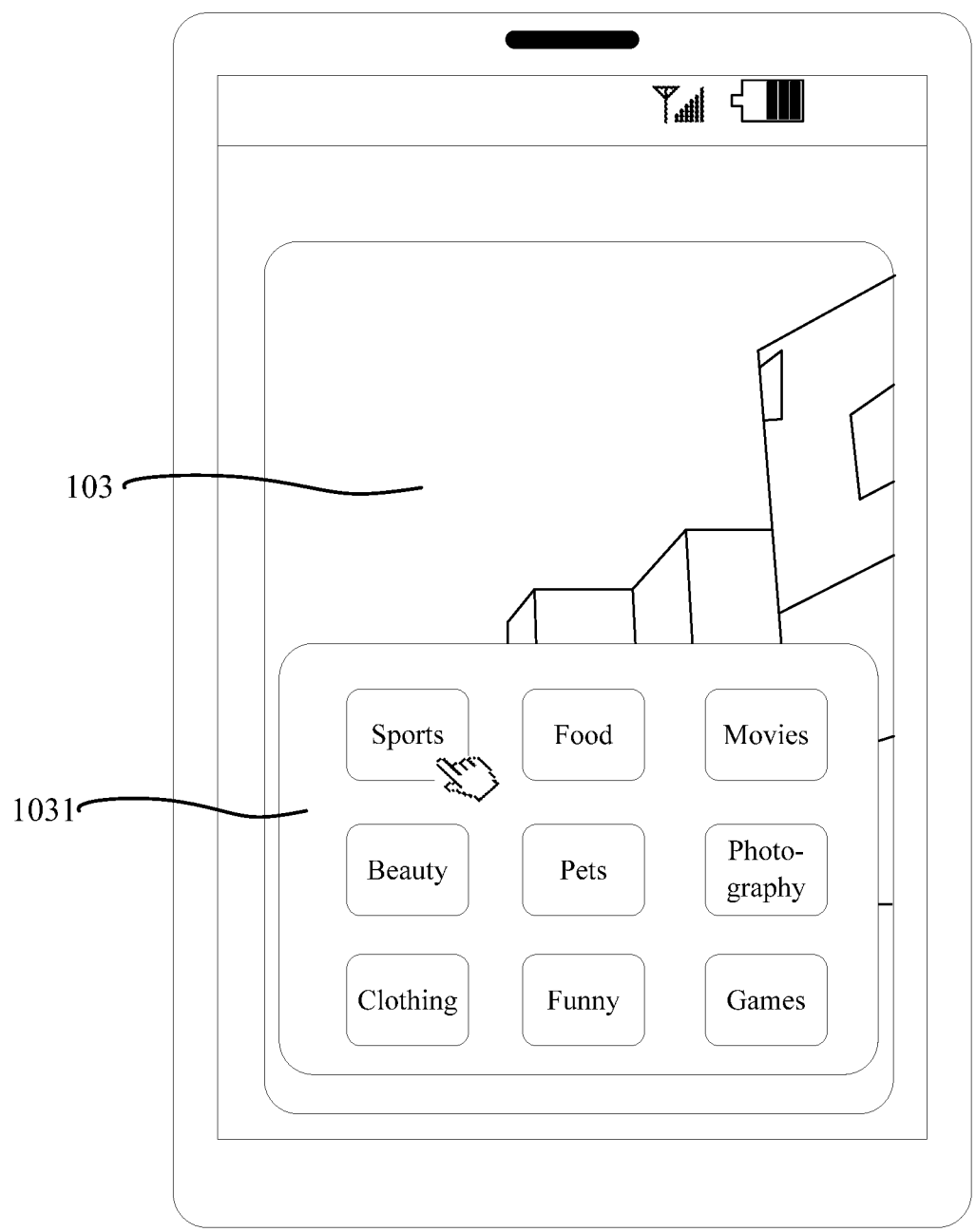

As shown in FIG. 1A, the execution subject of the label display method may be a video stream application installed on a smartphone. A user may watch a video stream through the video stream application. The video stream may be a feed stream, and the user may continuously update and play video through continuous refresh operations. In other words, the user may watch multiple videos continuously through refresh operations such as scrolling up. As an example, assume that the video stream application is playing a video 101 at the current moment. After the user refreshes, as an example, a video 102 played after the user refreshes is illustratively illustrated as shown in FIG. 1B. Continuing to refresh, as an example, a video 103 played after continuing to refresh is illustratively illustrated as shown in FIG. 1C. In addition, a label selection control 1031 is also displayed on a feed display interface. As an example, the label selection control 1031 may be displayed on an upper layer of the video 103. The label control 1031 may correspond to at least one label. As an example, as shown in FIG. 1C, the label selection control 1031 may correspond to 9 labels, namely "Sports", "Food", "Movies", "Beauty", "Pets", "Photography", "Clothing", "Funny", "Games". It can be understood that the number and content of labels can be set according to actual needs.

Figure 1D:
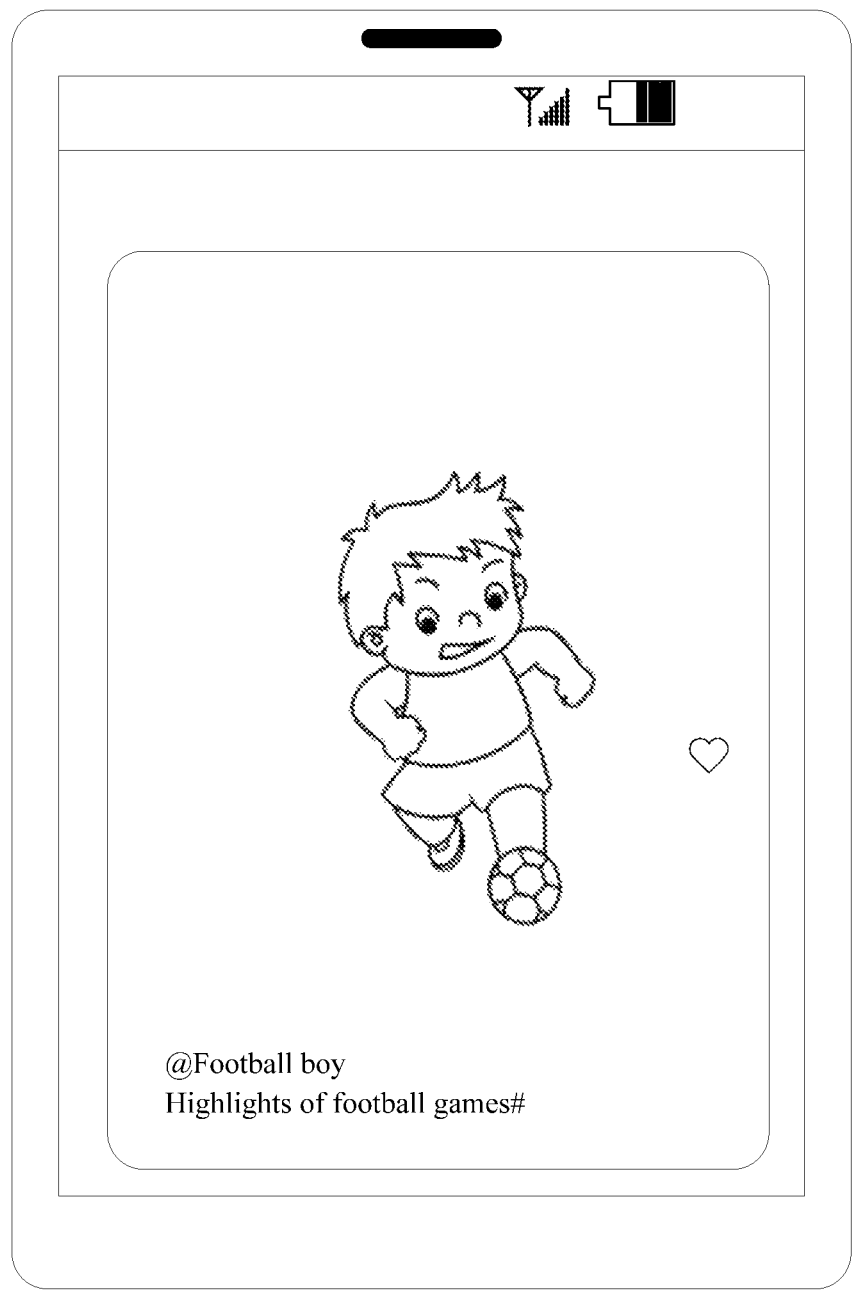

On this basis, the user may perform a selection operation on the at least one label, for example, may click the label "Sports". Therefore, the video stream application can receive selection information inputted by the user through performing the selection operation on the at least one label. On this basis, recommended information corresponding to the selection information may be acquired. In this application scenario, it may be a sports video. Thus, the sports video may be displayed on the feed display interface, as shown in FIG. 1D.

Figure 2:
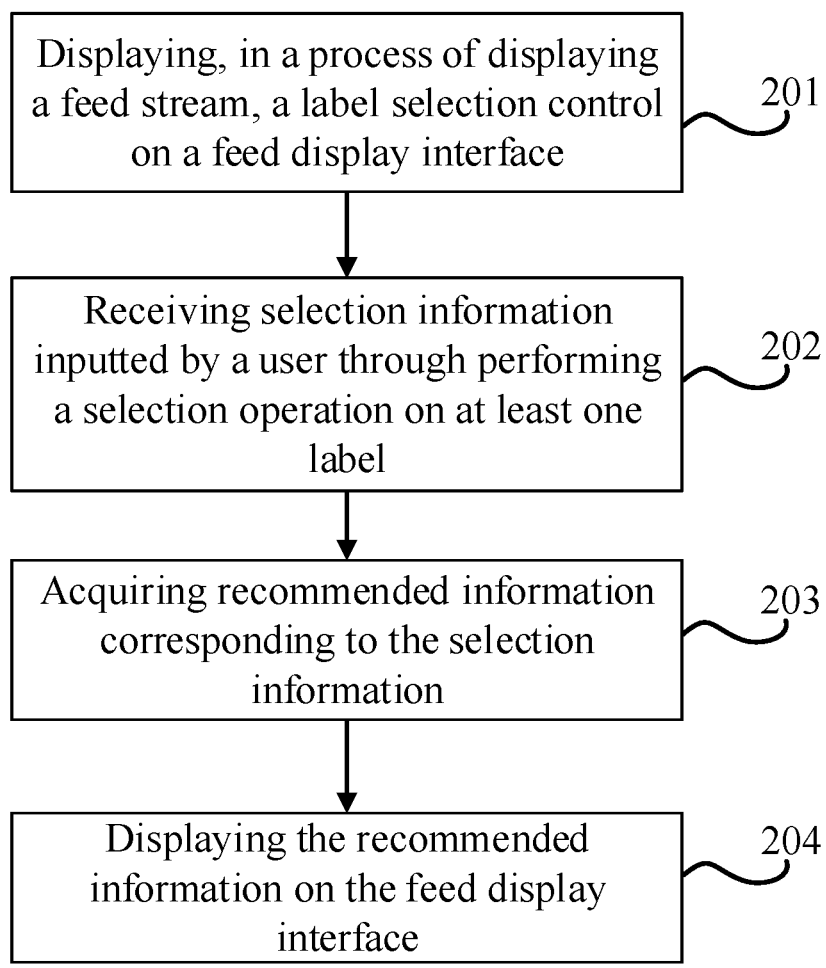
FIG. 2 is a flowchart of some embodiments of a label display method according to the present disclosure.

With continued reference to FIG. 2, a process 200 for some embodiments of the label display method according to the present disclosure is shown. The label display method is applied to a feed display interface and includes the following steps:

Step 201: displaying, in a process of displaying a feed stream, a label selection control on a feed display interface, where the label selection control corresponds to at least one label.

In some embodiments, the execution subject of the label display method may display a label selection control on a feed display interface in the process of displaying a feed stream. In practice, the feed display interface may be configured to display a feed stream, where the feed stream may continuously provide content to a user, and the content may be text, pictures, videos, and so on. In practice, as an example, the label selection control may be displayed on an upper layer of other elements in the feed display interface to facilitate the user's selection.

In some embodiments, the label selection control corresponds to at least one label, as shown in FIG. 1C. In practice, the label selection control allows a user to select a label by clicking or other operations, so as to realize the input of relevant information. In practice, according to actual needs, the at least one label corresponding to the label selection control may be all displayed on a screen, or part of the labels may be displayed on one screen. As an example, the user may implement switching and displaying of the at least one label by sliding left and right.

Figure 3A:
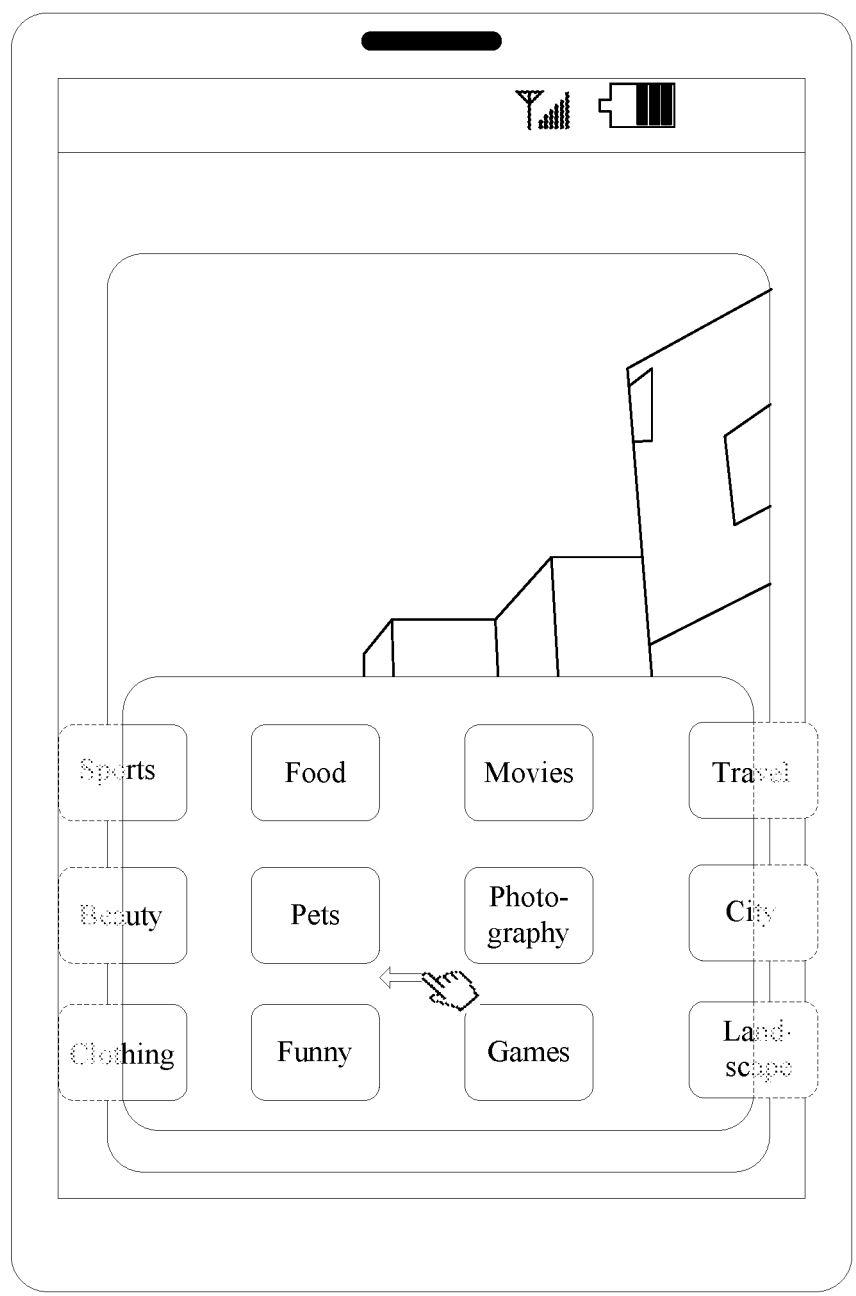
FIG. 3A and FIG. 3B are illustrative schematic diagrams of switching and displaying at least one label corresponding to a label selection control.
Figure 3B:
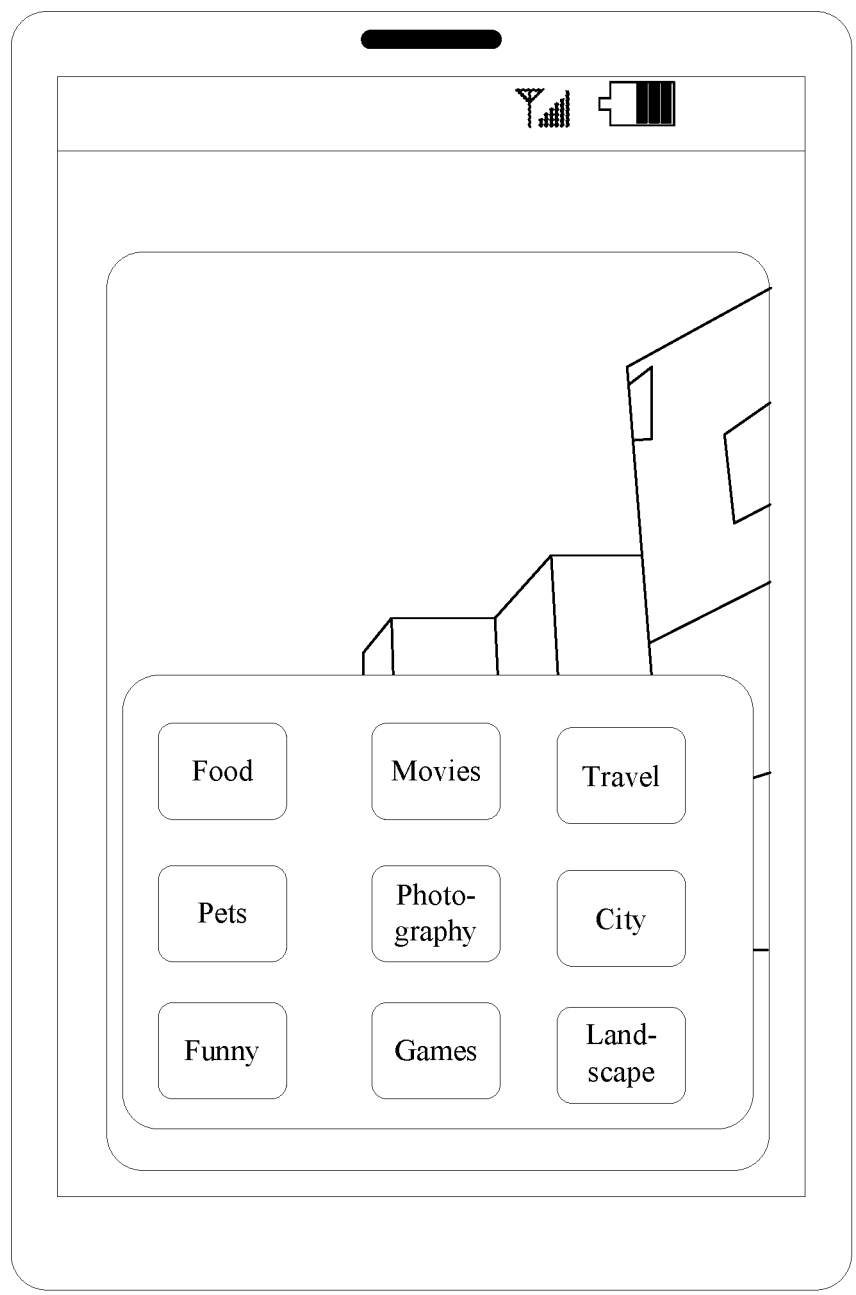

FIG. 3A and FIG. 3B are illustrative schematic diagrams of switching and displaying at least one label corresponding to the label selection control. Continue to take FIG. 1C as an example of current displayed labels. Illustratively, the label selection control 1031 in FIG. 1C corresponds to 12 labels, 9 of which are shown in the figure. A user may switch and display the labels through operations such as sliding. For example, as shown in FIG. 3A, the user may slide to the left, and the three labels of "Sports", "Beauty" and "Clothing" will move out of the screen, and the three labels of "Travel", "City" and "Scenery" may be displayed. The display result after the switching is completed is as shown in FIG. 3B.

In an optional implementation of some embodiments, displaying the label selection control on the feed display interface in the process of displaying the feed stream, includes: displaying the label selection control on an i-th piece of information, where i is a preset number. The preset number may be any number according to actual needs. For example, the preset number is 1. In other words, the label selection control is displayed on the first piece of information displayed. For another example, the preset number may also be 3. In other words, the label selection control is displayed on the third piece of information displayed.

In an optional implementation of some embodiments, displaying the label selection control on the feed display interface in the process of displaying the feed stream includes: displaying the label selection control on the feed display interface in response to detecting that an operation of a user on the displayed feed stream meets a label display trigger condition. In practice, in the process of displaying a feed stream, a user may perform various operations, including but not limited to: refreshing, liking, giving a comment, following, taking video of a same style, and so on. In practice, the user's operation during the display of the feed stream may reflect, to a certain extent, whether the user is interested in the displayed information. Therefore, the execution subject may detect the user's operation on the displayed information. The operation here may be an operation on a single piece of information, or on multiple pieces of information. For example, detecting an operation of a user on a played video may be: detecting whether the user likes a certain video, or whether the user likes any video of three consecutively played videos, etc.

On this basis, in response to detecting that the operation of the user on the displayed information meets the label display trigger condition, the label selection control is displayed on the feed display interface, where the label display trigger condition may be set according to actual needs to achieve different purposes. As an example, the label display trigger condition may be: whether a number of likes by the user exceeds a predefined threshold, whether the user comments, whether a refresh frequency exceeds a predefined threshold, etc. For example, by detecting whether the refresh frequency exceeds a preset threshold, it may be determined whether the user is interested in the displayed information. In response to detecting that the user's refresh frequency for the displayed information exceeds a preset threshold, it may be determined that the user is not interested in the displayed information, and thus, the label selection control is displayed on the feed display interface so that the user selects a label of interest, thereby realizing the display of more personalized and targeted information.

In these implementations, it is determined whether the user is interested in the displayed information by detecting the user's operation. Thus, the label selection control can be displayed on the feed display interface at an appropriate time. Compared with displaying the label selection control at any time in the process of displaying the feed stream, it can not only reduce the interference to the user, but also receive user feedback in time, and further increase the pertinence of the displayed information.

Step 202: receiving selection information inputted by a user through performing a selection operation on the at least one label.

In some embodiments, on the basis of step 201, the execution subject of the label display method may receive selection information inputted by a user through performing a selection operation on the at least one label. Optionally, the feed display interface may also display prompt information to prompt the user to select a label. In practice, the selection operation performed by the user on the at least one label may be various operations, such as clicking, sliding, clicking a checkbox, etc. In practice, each label may correspond to a label name, and when the user selects the label, it can be regarded that the user is more interested in content corresponding to the label name. If the user selects a certain label, it can be regarded that the user inputs the selection information through selecting the label. As an example, the inputted selection information may be the label name of the selected label.

Step 203: acquiring recommended information corresponding to the selection information.

In some embodiments, the above execution subject may obtain recommended information corresponding to the selection information locally, or from a server, or from other electronic devices.

As an example, in a case of obtaining the recommended information corresponding to the selection information from a server, the above execution subject may send the selection information to the server, so that the server can select a recommended video based on the selection information. In practice, the server may use various recommendation algorithms to select a recommended video from a large number of videos based on the selection information. On this basis, the server may send the recommended video to a terminal.

Step 204: displaying the recommended information on the feed display interface.

In the label display method provided by some embodiments of the present disclosure, the timing of the label display can be flexibly controlled by displaying the label selection control in the process of displaying a feed stream.

Figure 4:
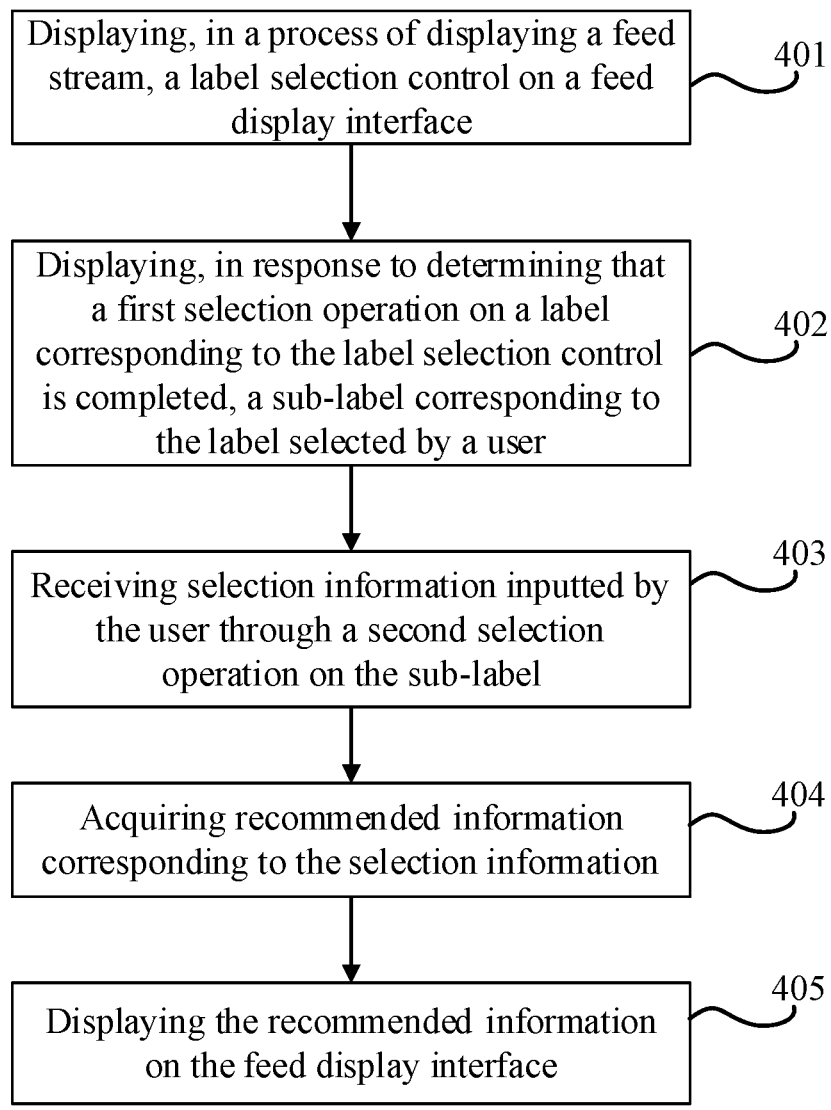
FIG. 4 is a flowchart of some other embodiments of a label display method according to the present disclosure.

Further refer to FIG. 4, which shows a process 400 of some other embodiments of the label display method. The process 400 of the label display method includes the following steps:

Step 401, displaying, in a process of displaying a feed stream, a label selection control on a feed display interface, where the label selection control corresponds to at least one label.

In some embodiments, for the specific implementation of step 401 and the technical effect thereof, reference may be made to step 201 in the embodiments corresponding to FIG. 2 which will not be repeated here.

In an optional implementation of some embodiments, the above method may further include: in response to detecting a selection operation on the at least one label, adjusting a display style of a selected label.

Step 402, displaying, in response to determining that a first selection operation on a label corresponding to the label selection control is completed, a sub-label corresponding to the label selected by a user Step 403: receiving selection information inputted by the user through a second selection operation on the sub-label.

In some embodiments, at least one label corresponding to the label selection control may be divided into two or more levels for displaying labels, thus making the selection information inputted by the user more accurate.

Figure 5A:
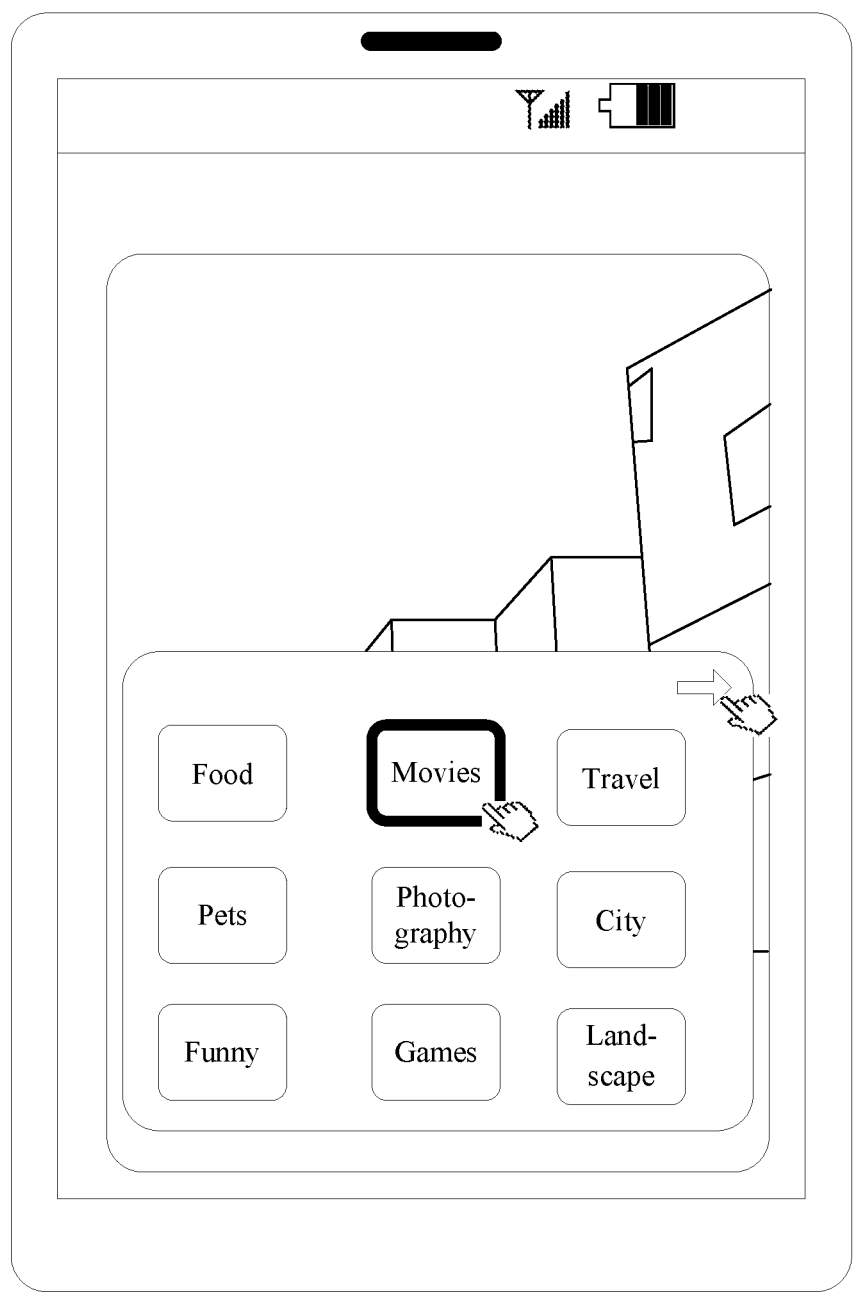
FIG. 5A and FIG. 5B are illustrative schematic diagrams when at least one label corresponding to the label selection control is divided into two levels.
Figure 5B:
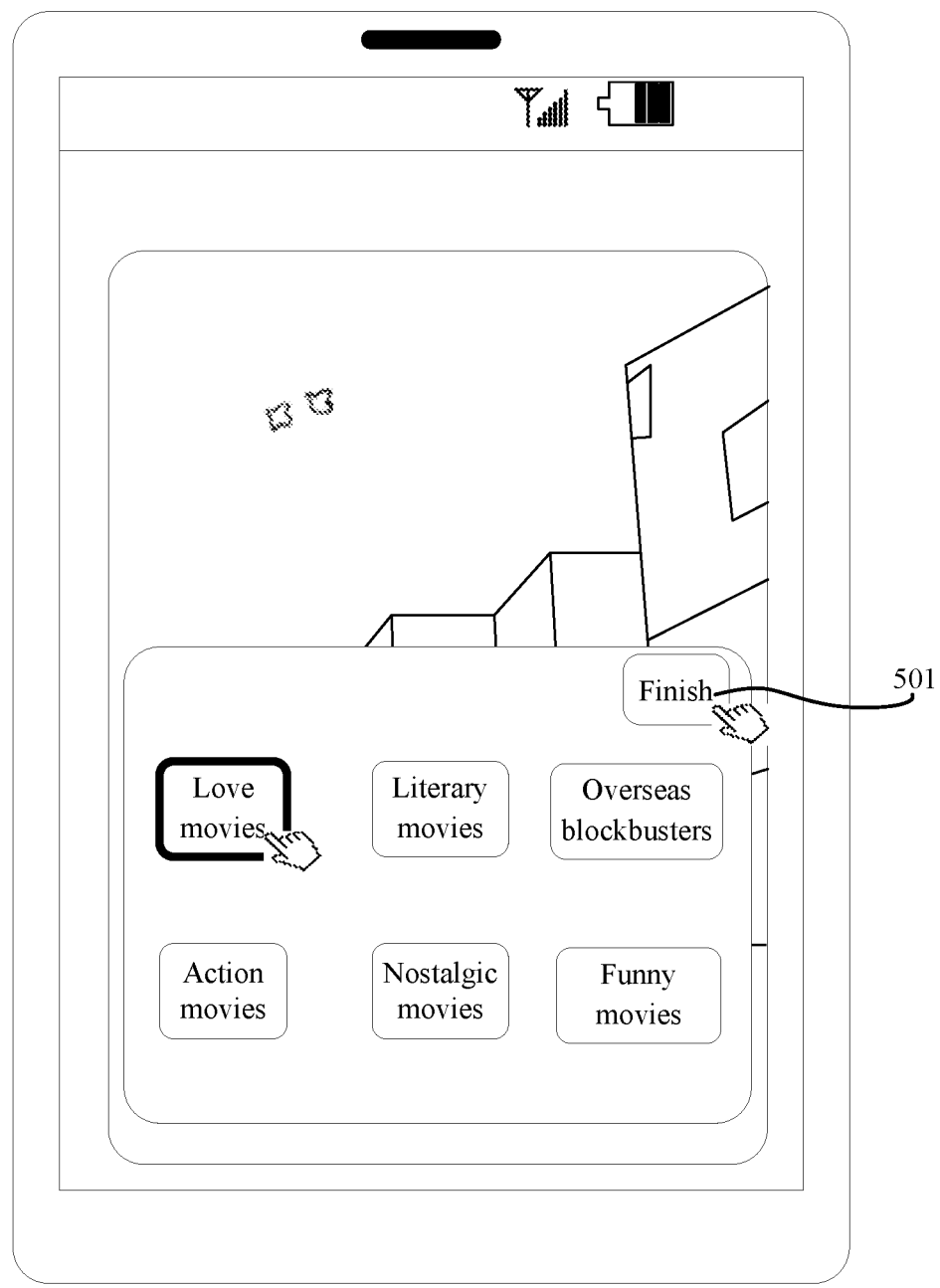

FIG. 5A and FIG. 5B show illustrative schematic diagrams when at least one label corresponding to the label selection control is divided into two levels.

As shown in FIG. 5A, a current displayed label having corresponding sub-labels is taken as an example. If the user selects the label "Movies", sub-labels corresponding to the label "Movies" may be displayed. As shown in FIG. 5B, the sub-labels corresponding to the label "Movies" selected by the user are illustratively displayed. As an example, the sub-labels "Love movies", "Literary movies", "Overseas blockbusters", "Action movies", "Nostalgic movies", "Funny movies" may be included. On this basis, the user can continue to choose among the displayed sub-labels. As an example, the user may select the sub-label "Love movies".

In some optional implementations of some embodiments, in response to detecting the selection operation on the least one label, a first control may be displayed or activated, and the first control is configured to trigger an operation of finishing selection. As an example, with continued reference to FIG. 5B, a first control 501 may be displayed or activated in response to the user selecting the sub-label "Love Movies". The user may finish the selection operation by clicking the first control 501 or other operations. Certainly, as needed, for the case of two or more levels of labels, the first control may be displayed or activated at any level of labels, which is not limited in the present disclosure.

Step 404: acquiring recommended information corresponding to the selection information.

Step 405: displaying the recommended information on the feed display interface.

In some embodiments, for the specific implementation of steps 404-405 and the technical effects thereof, reference may be made to steps 203-204 in the embodiments corresponding to FIG. 2, which will not be repeated here.

In some optional implementations, the above method further includes: in response to detecting that an operation of the user on the recommended information meets a sub-label display trigger condition, displaying a sub-label selection control on the feed display interface, where the sub-label selection control corresponds to at least one sub-label.

In these optional implementations, which are different from the implementations that continuously display multiple levels of labels, the display manner of multi-level labels is enriched so as to adapt to different scenario requirements.

As can be seen from FIG. 4, compared with the description of some embodiments corresponding to FIG. 2, a sub-label selection control may further be displayed in the feed display interface, and the sub-label selection control corresponds to at least one sub-label. Thus, the user is supported to make a further selection. Through two or more selections, the information inputted by the user is made more accurate.

Figure 6:
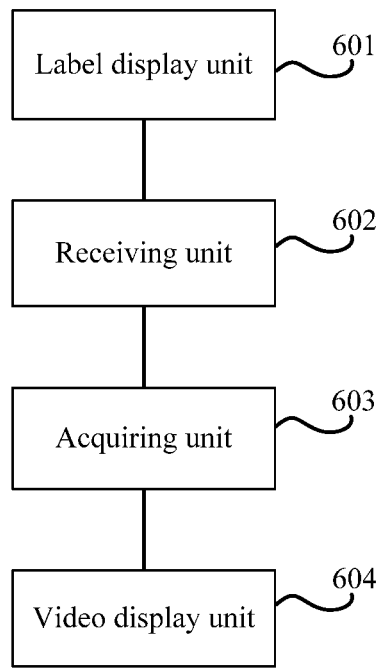
FIG. 6 is a schematic structural diagram of some embodiments of a label display apparatus according to the present disclosure.

Further referring to FIG. 6, as an implementation of the methods shown in the above figures, the present disclosure provides some embodiments of a label display apparatus that correspond to those method embodiments shown in FIG. 2, and the apparatus specifically may be applied in various electronic devices.

As shown in FIG. 6, the label display apparatus 600 of some embodiments includes a label display unit 601, a receiving unit 602, an acquiring unit 603, and a video display unit 604. The label display unit 601 is configured to display a label selection control on a feed display interface in a process of displaying a feed stream, where the label selection control corresponds to at least one label; the receiving unit 602 is configured to receive selection information inputted by a user through performing a selection operation on the at least one label; the acquiring unit 603 is configured to acquire recommended information corresponding to the selection information; and the video display unit 604 is configured to display the recommended information on the feed display interface.

In an optional implementation of some embodiments, the label display unit 601 is further configured to: in response to detecting that an operation of the user on the displayed feed stream meets a label display trigger condition, display the label selection control on the feed display interface.

In an optional implementation of some embodiments, the label display unit 601 may be further configured to: display the label selection control on an i-th piece of information, where i is a preset number.

In an optional implementation of some embodiments, the receiving unit 602 is further configured to: in response to determining that a first selection operation on a label corresponding to the label selection control is completed, display a sub-label corresponding to the label selected by the user; and receive selection information inputted by the user through a second selection operation on the sub-label.

In an optional implementation of some embodiments, the apparatus 600 may be further configured to: display a sub-label selection control on a target video in response to detecting that an operation of the user on a recommended video meets a second preset condition, where the sub-label selection control corresponds to at least one sub-label.

In an optional implementation of some embodiments, the apparatus 600 may further include: an adjustment unit (not shown in the figure), where the adjustment unit is configured to adjust a display style of a selected label in response to detecting the selection operation on the at least one label.

In an optional implementation of some embodiments, the apparatus 600 may further include: a control display unit (not shown in the figure), where the control display unit may be further configured to: in response to detecting the selection operation on the at least one label, display a first control, where the first control is configured to trigger an operation of finishing selection.

In some embodiments, the label selection control may be displayed in a process of playing a video stream, and the timing of the label display can be flexibly controlled.

Figure 7:
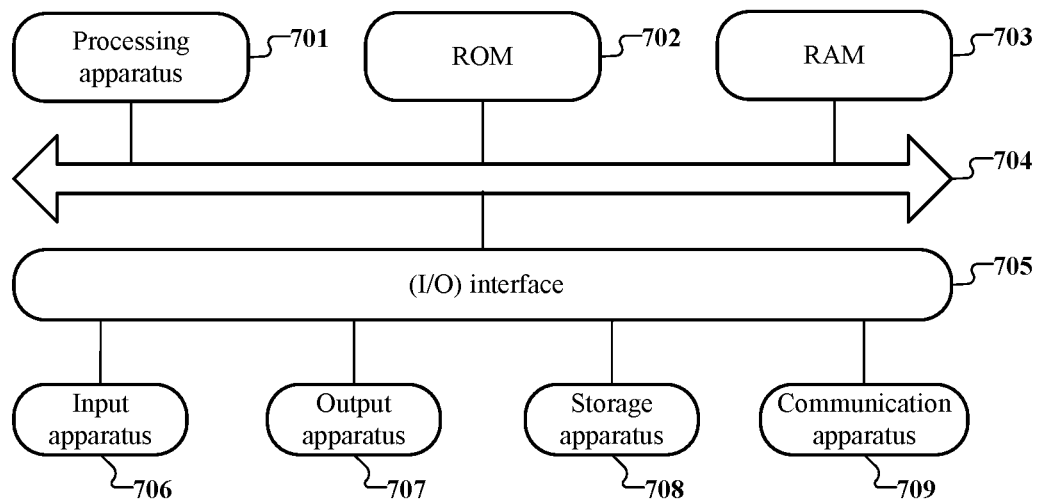
FIG. 7 is a schematic structural diagram of an electronic device suitable for implementing some embodiments of the present disclosure.

Refer to FIG. 7, which shows a schematic structural diagram of an electronic device (e.g., the terminal device in FIG. 1) 700 suitable for implementing some embodiments of the present disclosure. The electronic device in some embodiments of the present disclosure may include, but are not limited to a mobile terminal such as a mobile phone, a notebook computer, a digital broadcast receiver, a personal digital assistant (PDA), a portable android device (PAD), a portable multimedia player (PMP), an in-vehicle navigation terminals, and a fixed terminal such as a digital TV and a desktop computer. The electronic device shown in FIG. 6 is only an example, and should not impose any limitation on the function and scope of use of the embodiments of the present disclosure.

As shown in FIG. 7, an electronic device 700 may include a processing apparatus (e.g., a central processing unit, a graphics processor, etc.) 701 that may perform various appropriate actions and processes based on a program stored in a read-only memory (ROM) 702 or loaded from a storage unit 708 into a random-access memory (RAM) 703. In the RAM 703, various programs and data necessary for the operation of the electronic device 700 are also stored. The processing apparatus 701, the ROM 702, and the RAM 703 are connected to each other through a bus 704. An input/output (I/O) interface 705 is also connected to the bus 704.

Typically, the following apparatuses may be connected to the I/O interface 705: an input apparatus 706 including, for example, a touch screen, a touchpad, a keyboard, a mouse, a camera, a microphone, an accelerometer, a gyroscope, etc.; an output apparatus 707 including, for example, a liquid crystal display (LCD), a speaker, a vibrator, etc.; a storage apparatus 708 including, for example, a memory card, etc.; and a communication apparatus 709. The communication apparatus 709 may allow the electronic device 700 to communicate wirelessly or wired with other devices to exchange data. Although FIG. 7 shows an electronic device 700 having various apparatuses, it should be understood that it is not required to implement or have all of the apparatuses illustrated. More or fewer apparatuses may alternatively be implemented or provided. Each block shown in FIG. 7 may represent one unit, or may also represent multiple apparatuses as required.

In particular, according to some embodiments of the present disclosure, the processes described above with reference to the flowcharts may be implemented as computer software programs. For example, some embodiments of the present disclosure provide a computer program product, which includes a computer program carried on a computer-readable medium, the computer program containing program code for performing the method illustrated in the flowcharts. In some such embodiments, the computer program may be downloaded and installed from a network via the communication apparatus 709, or installed from the storage apparatus 708, or installed from the ROM 702. When the computer program is executed by the processing apparatus 701, the above functions defined in the methods of some embodiments of the present disclosure are performed.

It should be noted that the computer-readable medium described in some embodiments of the present disclosure may be a computer-readable signal medium or a computer-readable storage medium, or any combination of the above two. The computer-readable storage medium may be, for example, but not limited to, an electrical, magnetic, optical, electromagnetic, infrared, or semiconductor system, apparatus or device, or any combination of the above. More specific examples of the computer-readable storage medium may include, but are not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In some embodiments of the present disclosure, the computer-readable storage medium may be any tangible medium that contains or stores a program that can be used by or in combination with an instruction execution system, apparatus, or device. Rather, in some embodiments of the present disclosure, a computer-readable signal medium may include a data signal propagated in baseband or as part of a carrier wave, carrying computer-readable program code therein. Such a propagated data signal may take a variety of forms, including but not limited to an electromagnetic signal, an optical signal, or any suitable combination of the foregoing. The computer-readable signal medium may also be any computer-readable medium other than a computer-readable storage medium, and the computer-readable signal medium can transmit, propagate, or transport the program for use by or in combination with an instruction execution system, apparatus, or device. The program code contained on the computer-readable medium may be transmitted using any suitable medium including, but not limited to, an electrical wire, an optical fiber cable, an RF (radio frequency), etc., or any suitable combination of the foregoing.

In some embodiments, a client and a server may communicate using any currently known or future developed network protocol such as HyperText Transfer Protocol (HTTP) and may interconnect with any form or medium of digital data communication (e.g., a communications network). Examples of the communication network include a local area network ("LAN"), a wide area networks ("WAN"), an inter-network (e.g., the Internet), and an end-to-end network (e.g., ad hoc end-to-end networks), as well as any currently known or future developed networks.

The above computer-readable medium may be included in the above electronic device, or may exist alone without being assembled into the electronic device. The above computer-readable medium carries one or more programs, and when the above-mentioned one or more programs are executed by the electronic device, the electronic device is configured to display a label selection control in a feed display interface in a process of displaying a feed stream, where the label selection control corresponds to at least one label; receive selection information inputted by a user through performing a selection operation on the at least one label; acquiring recommended information corresponding to the selection information; and displaying the recommended information on the feed display interface.

Computer program code for carrying out operations of some embodiments of the present disclosure may be written in one or more programming languages, including object-oriented programming languages—such as Java, Smalltalk, C++, or a combination thereof, as well as conventional procedural programming languages—such as "C" or similar programming languages. The program code may be executed entirely on a user computer, partly on a user computer, as a stand-alone software package, partly on a user computer and partly on a remote computer, or entirely on a remote computer or a server. In a case involving a remote computer, the remote computer may be connected to a user computer through any kind of network, including a local area network (LAN) or a wide area network (WAN), or may be connected to an external computer (e.g., using an Internet service provider to connect via an Internet connection).

The flowcharts and block diagrams in the drawings illustrate architecture, functionality, and operations that may be implemented by the system, the method, and the computer program product in accordance with various embodiments of the present disclosure. At this point, each block in a flowchart or block diagram may represent a module, program segment, or portion of code that contains one or more executable instructions for implementing a specified logical function. It should also be noted that in some alternative implementations, the functions indicated in the blocks may also occur in a different order than those indicated in the drawings. For example, two blocks shown one after the other can actually be executed in parallel substantially, or they may sometimes be executed in an opposite order, depending on functions involved. It should still be noted that each block in the block diagram and/or flowchart, and a combination of blocks in the block diagram and/or flowchart, may be implemented with a dedicated hardware-based system that performs a specified function or operation, or may be implemented with a combination of dedicated hardware and computer instructions.

The units described in some embodiments of the present disclosure may be implemented using software, and may also be implemented using hardware. The described units may also be provided in a processor, for example, may be described as: a processor includes a label display unit, a receiving unit, an acquiring unit, and a video display unit. The names of these units do not constitute a limitation of the units themselves under certain circumstances. For example, the display unit may also be described as "a unit which displays a label selection control on a feed display interface in a process of displaying a feed stream".

The above functions described herein may be performed, at least in part, by one or more hardware logic components. For example, without limitation, exemplary types of hardware logic components that may be used include: a field programmable gate array (FPGA), an application-specific integrated circuit (ASIC), an application specific standard product (ASSP), a systems on chip (SOC), a complex programmable logical device (CPLD), etc.

According to one or more embodiments of the present disclosure, a label display method is provided, including:

displaying a label selection control on a feed display interface in a process of displaying a feed stream, where the label selection control corresponds to at least one label; receiving selection information inputted by a user through performing a selection operation on the at least one label; acquiring recommended information corresponding to the selection information; and displaying the recommended information on the feed display interface.

According to one or more embodiments of the present disclosure, displaying the label selection control on the feed display interface in the process of displaying the feed stream includes: in response to detecting that an operation of the user on the displayed feed stream meets a label display trigger condition, displaying the label selection control on the feed display interface.

According to one or more embodiments of the present disclosure, displaying the label selection control on the feed display interface in the process of displaying the feed stream includes: displaying the label selection control on an i-th piece of information, where i is a preset number.

According to one or more embodiments of the present disclosure, receiving selection information inputted by the user through performing the selection operation on the at least one label, includes: in response to determining that a first selection operation on a label corresponding to the label selection control is completed, displaying a sub-label corresponding to the label selected by the user; and receiving selection information inputted by the user through a second selection operation on the sub-label.

According to one or more embodiments of the present disclosure, the method further comprises: in response to detecting that an operation of the user on recommended information meets a sub-label display trigger condition, displaying a sub-label selection control on the feed display interface, the sub-label selection control corresponding to at least one sub-label.

According to one or more embodiments of the present disclosure, before receiving the selection information inputted by the user through performing the selection operation on the at least one label, the method further includes: in response to detecting the selection operation on the at least one label, adjusting a display style of a selected label.

According to one or more embodiments of the present disclosure, the method further comprises: in response to detecting the selection operation on the at least one label, displaying a first control, where the first control is configured to trigger an operation of finishing selection.

According to one or more embodiments of the present disclosure, there is provided a label display apparatus including: a label display unit, configured to display a label selection control on a feed display interface in a process of displaying a feed stream, where the label selection control corresponds to at least one label; a receiving unit, configured to receive selection information inputted by a user through performing a selection operation on the at least one label; an acquiring unit, configured to acquire recommended information corresponding to the selection information; a video display unit, configured to display the recommended information on the feed display interface.

According to one or more embodiments of the present disclosure, the label display unit is further configured to: in response to detecting that an operation of the user on the displayed feed stream meets a label display trigger condition, display the label selection control on the feed display interface.

According to one or more embodiments of the present disclosure, the label display unit may further be configured to display the label selection control on an i-th piece of information, where i is a preset number.

According to one or more embodiments of the present disclosure, the receiving unit is further configured to: in response to determining that a first selection operation on a label corresponding to the label selection control is completed, display a sub-label corresponding to the label selected by the user; and receive selection information inputted by the user through a second selection operation on the sub-label.

According to one or more embodiments of the present disclosure, the apparatus may further be configured to: in response to detecting that an operation of the user on a recommended video meets a second preset condition, display a sub-label selection control on a target video, the sub-label selection control corresponding to at least one sub-label.

According to one or more embodiments of the present disclosure, the apparatus may further include: an adjustment unit. The adjustment unit is configured to, in response to detecting the selection operation on the at least one label, adjust a display style of a selected label.

According to one or more embodiments of the present disclosure, the apparatus may further include a control display unit. The control display unit may be further configured to display a first control in response to detecting the selection operation on the at least one label, where the first control is configured to trigger an operation of finishing selection.

According to one or more embodiments of the present disclosure, there is provided an electronic device including: one or more processors; a storage apparatus having one or more programs stored thereon, and when the one or more programs are executed by the one or more processors, the one or more processors are caused to implement any of the methods described above.

According to one or more embodiments of the present disclosure, there is provided a computer-readable medium having a computer program stored thereon, where the program, when executed by a processor, implements any of the methods described above.

The above description is merely a description of some preferred embodiments of the present disclosure and of the technical principles employed. It should be understood by those skilled in the art that the scope of the invention covered by the embodiments of the present disclosure is not limited to the technical solutions resulting from a particular combination of the above technical features, but should also cover other technical solutions resulting from any combination of the above technical features or their equivalent features without departing from the above inventive concept. For example, the above features are interchangeable with (but not limited to) technical features with similar functions disclosed in the embodiments of the present disclosure.

What is claimed is:

1. A label display method, applied to a feed display interface, comprising:
   displaying, in a process of displaying a feed stream, a label selection control on the feed display interface, wherein the label selection control corresponds to at least one label;
   receiving selection information inputted by a user through performing a selection operation on the at least one label;

displaying, in response to detecting the selection operation on the at least one label, a first control, wherein the first control is configured to trigger to finish the selection operation;
acquiring recommended information corresponding to the selection information; and
displaying the recommended information on the feed display interface;
wherein displaying, in the process of displaying the feed stream, the label selection control on the feed display interface, comprises:
in response to detecting that an operation of the user on the displayed feed stream meets a label display trigger condition, triggering to display the label selection control on the feed display interface;
wherein the receiving the selection information inputted by the user through performing the selection operation on the at least one label further comprises:
displaying, in response to determining that a first selection operation on a label corresponding to the label selection control is completed, a sub-label corresponding to the label selected by the user; and
receiving selection information inputted by the user through a second selection operation on the sub-label;
wherein that the operation of the user on the displayed feed stream meets the label display trigger condition comprises at least one of the following:
a number of liking operations performed on content of the feed stream by the user exceeds a first predefined threshold;
a commenting operation is performed on the content of the feed stream by the user; and
a refresh frequency of performing a refreshing operation on the content of the feed stream exceeds a second predefined threshold.

2. The method according to claim 1, wherein the method further comprises:
displaying, in response to detecting that an operation of the user on the recommended information meets a sub-label display trigger condition, a sub-label selection control on the feed display interface, wherein the sub-label selection control corresponds to at least one sub-label.

3. The method according to claim 1, wherein, before the receiving the selection information inputted by the user through performing the selection operation on the at least one label, the method further comprises:
adjusting, in response to detecting the selection operation on the at least one label, a display style of a selected label.

4. The method according to claim 1, wherein the feed stream provides content to the user continuously, and the content comprises multiple pieces of information, each piece of information being one of a video, an image and a text.

5. The method according to claim 1, wherein each of the at least one label has a label name, and the selection information inputted by the user is used to indicate that the user is interested in content corresponding to the label name of a selected label;
wherein the recommended information is continuously selected based on the selection information and displayed in the feed stream, and the recommended information is related to the content corresponding to the label name of the selected label.

6. An electronic device, comprising:
one or more processors; and
a storage apparatus, having one or more computer programs stored thereon,
wherein, when the one or more computer programs are executed by the one or more processors, the one or more processors are caused to:
display, in a process of displaying a feed stream, a label selection control on a feed display interface, wherein the label selection control corresponds to at least one label;
receive selection information inputted by a user through performing a selection operation on the at least one label;
display, in response to detecting the selection operation on the at least one label, a first control, wherein the first control is configured to trigger to finish the selection operation;
acquire recommended information corresponding to the selection information; and
display the recommended information on the feed display interface;
wherein, when the one or more computer programs are executed by the one or more processors, the one or more processors are caused to:
in response to detecting that an operation of the user on the displayed feed stream meets a label display trigger condition, trigger to display the label selection control on the feed display interface;
wherein, when the one or more computer programs are executed by the one or more processors, the one or more processors are caused to:
display, in response to determining that a first selection operation on a label corresponding to the label selection control is completed, a sub-label corresponding to the label selected by the user; and
receive selection information inputted by the user through a second selection operation on the sub-label;
wherein that the operation of the user on the displayed feed stream meets the label display trigger condition comprises at least one of the following:
a number of liking operations performed on content of the feed stream by the user exceeds a first predefined threshold;
a commenting operation is performed on the content of the feed stream by the user; and
a refresh frequency of performing a refreshing operation on the content of the feed stream exceeds a second predefined threshold.

7. The electronic device according to claim 6, wherein, when the one or more computer programs are executed by the one or more processors, the one or more processors are caused to:
display, in response to detecting that an operation of the user on the recommended information meets a sub-label display trigger condition, a sub-label selection control on the feed display interface, wherein the sub-label selection control corresponds to at least one sub-label.

8. The electronic device according to claim 6, wherein, when the one or more computer programs are executed by the one or more processors, the one or more processors are caused to:
adjust, in response to detecting the selection operation on the at least one label, a display style of a selected label.

9. The electronic device according to claim 6, wherein the feed stream provides content to the user continuously, and the content comprises multiple pieces of information, each piece of information being one of a video, an image and a text.

10. The electronic device according to claim 6, wherein each of the at least one label has a label name, and the selection information inputted by the user is used to indicate that the user is interested in content corresponding to the label name of a selected label;
    wherein the recommended information is continuously selected based on the selection information and displayed in the feed stream, and the recommended information is related to the content corresponding to the label name of the selected label.

11. A non-transitory computer-readable storage medium having a computer program stored thereon, wherein when the computer program is executed by a processor, the processor is caused to:
    display, in a process of displaying a feed stream, a label selection control on the feed display interface, wherein the label selection control corresponds to at least one label;
    receive selection information inputted by a user through performing a selection operation on the at least one label;
    display, in response to detecting the selection operation on the at least one label, a first control, wherein the first control is configured to trigger to finish the selection operation;
    acquire recommended information corresponding to the selection information; and
    display the recommended information on the feed display interface;
    wherein when the computer program is executed by a processor, the processor is further caused to:
    in response to detecting that an operation of the user on the displayed feed stream meets a label display trigger condition, trigger to display the label selection control on the feed display interface;
    wherein when the computer program is executed by the processor, the processor is caused to:
    display, in response to determining that a first selection operation on a label corresponding to the label selection control is completed, a sub-label corresponding to the label selected by the user; and
    receive selection information inputted by the user through a second selection operation on the sub-label;
    wherein that the operation of the user on the displayed feed stream meets the label display trigger condition comprises at least one of the following:
    a number of liking operations performed on content of the feed stream by the user exceeds a first predefined threshold;
    a commenting operation is performed on the content of the feed stream by the user; and
    a refresh frequency of performing a refreshing operation on the content of the feed stream exceeds a second predefined threshold.

12. The non-transitory computer-readable storage medium according to claim 11, wherein when the computer program is executed by the processor, the processor is caused to:
    display, in response to detecting that an operation of the user on the recommended information meets a sub-label display trigger condition, a sub-label selection control on the feed display interface, wherein the sub-label selection control corresponds to at least one sub-label.

13. The non-transitory computer-readable storage medium according to claim 11, wherein when the computer program is executed by the processor, the processor is caused to:
    adjust, in response to detecting the selection operation on the at least one label, a display style of a selected label.

14. The non-transitory computer-readable storage medium according to claim 11, wherein the feed stream provides content to the user continuously, and the content comprises multiple pieces of information, each piece of information being one of a video, an image and a text.

\* \* \* \* \*